US012639665B2

(12) United States Patent
Park

(10) Patent No.: US 12,639,665 B2
(45) Date of Patent: May 26, 2026

(54) METHOD AND SYSTEM FOR GENERATING PRODUCT ARRANGEMENT INFORMATION BY USING PRODUCT VOLUME INFORMATION

(71) Applicant: COLOSSEUM CORPORATION, INC., Seoul (KR)

(72) Inventor: Jinsu Park, Seoul (KR)

(73) Assignee: COLOSSEUM CORPORATION, INC., Seoul (KR)

( * ) Notice: Subject to any disclaimer, the term of this patent is extended or adjusted under 35 U.S.C. 154(b) by 173 days.

(21) Appl. No.: 18/530,121

(22) Filed: Dec. 5, 2023

(65) Prior Publication Data

US 2025/0069031 A1 Feb. 27, 2025

(30) Foreign Application Priority Data

Aug. 24, 2023 (KR) ........................ 10-2023-0110963

(51) Int. Cl.
G06Q 10/087 (2023.01)
(52) U.S. Cl.
CPC .................................. G06Q 10/087 (2013.01)
(58) Field of Classification Search
CPC ... G06Q 10/087; G06F 30/20; G06F 2111/20; G06F 2113/20
See application file for complete search history.

(56) References Cited

U.S. PATENT DOCUMENTS

| | | | | |
|---|---|---|---|---|
| 2017/0083864 A1* | 3/2017 | Saito | ................... | G06Q 30/0635 |
| 2022/0214667 A1* | 7/2022 | King | ................... | G05B 19/4188 |

FOREIGN PATENT DOCUMENTS

| | | | | |
|---|---|---|---|---|
| KR | 10-2022-0036173 A | 3/2022 | | |
| WO | WO-2021111201 A1* | 6/2021 | ............. | G06Q 10/04 |

* cited by examiner

*Primary Examiner* — Garcia Ade
(74) *Attorney, Agent, or Firm* — BROADVIEW IP LAW, PC

(57) ABSTRACT

A method and system for generating product arrangement information by using product volume information is proposed. The proposed relates to a method for generating arrangement information when products are loaded into a box by using volume information of the products, and a system for executing the method. The method includes an initial solution set creation step of generating a plurality of first sample objects having randomly generated loading order information and rotation direction information from product specification data including product size information and product rotation direction count information and an arrangement information generation step of crossing a pair of the first sample objects with each other to generate a plurality of second sample objects, and selecting the plurality of first or second sample objects in order of priority so as to be reset as the first sample objects.

9 Claims, 15 Drawing Sheets dimension information
(l', w', h') before rotation dimension information
(l', w', h') after rotation

FIG. 4A

| Item | Detail |
|---|---|
| box_name | Box name information i11 |
| boxi_size | Box size information i12 |
| dimension | Box dimension information i13 |
| price | Box price information i14 |

```
[
    {

"box_name" : "large" ,
        "box_size" : [35, 50, 25] ,
        "dimension" : ["1", "w", "h"] ,
        "price" : 1650
    },
    {

"box_name" : "medium" ,
        "box_size" : [31, 41, 15] ,
        "dimension" : ["1", "w", "h"] ,
        "price" : 1450
    },
    {

"box_name" : "minima13" ,
        "box_size" : [25, 35, 15] ,
        "dimension" : ["1", "w", "h"] ,
        "price" : 650
    },
    {

"box_name" : "minima12" ,
        "box_size" : [20, 26, 16] ,
        "dimension" : ["1", "w", "h"] ,
        "price" : 450
    },
    {

"box_name" : "minima11" ,
        "box_size" : [12, 18, 8] ,
        "dimension" : ["1", "w", "h"] ,
        "price" : 220
    },
```

< schema of box specification data i1 >                    < example of box specification data i1 >

FIG. 4B

| Item | Detail |
|------|--------|
| goods | Product size information i21 |
| rotations | Product rotation direction count information i22 |

```
{
    'group_name' : 'group1'
    'goods' : [ [9.0, 8.0, 10.0]
                [9.0, 8.0, 10.0]
                [9.0, 9.0, 11.0]
                [9.0, 9.0, 11.0]
                [9.0, 6.0, 130]
                [9.0, 6.0, 130]
    'rotations' : [6, 6, 6, 6, 6, 6]
}
```

< schema of product specification data i2 >          < example of product specification data i2 >

FIG. 5

| Item | Detail |
|------|--------|
| order | Loading order information si1 |
| rotations | Rotation direction information si2 |

```
'order' : [0, 5, 3, 1, 2, 4],
'rotation' : [3, 4, 4, 5, 0, 1]
```

< schema of sample object data si >          < example of sample object data si >

FIG. 7A
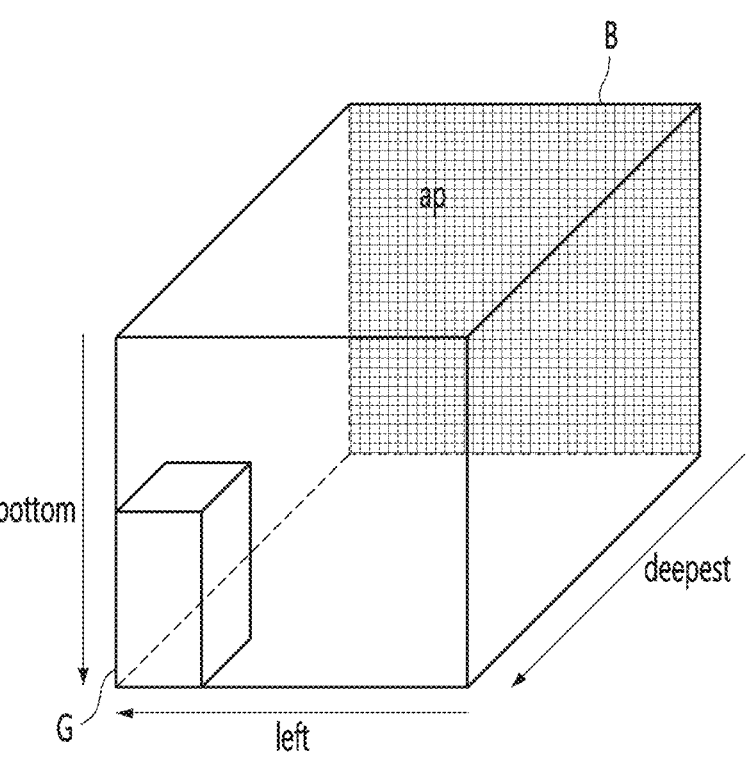
FIG. 7B
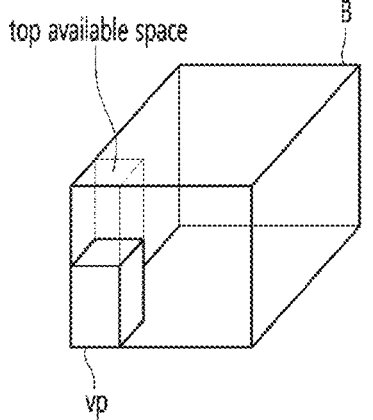
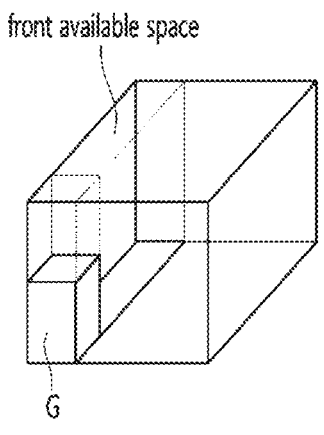
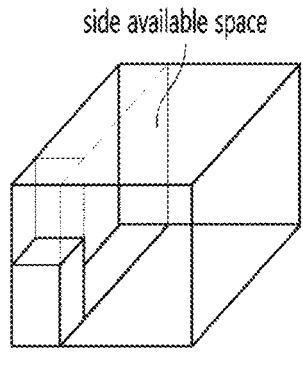

FIG. 8

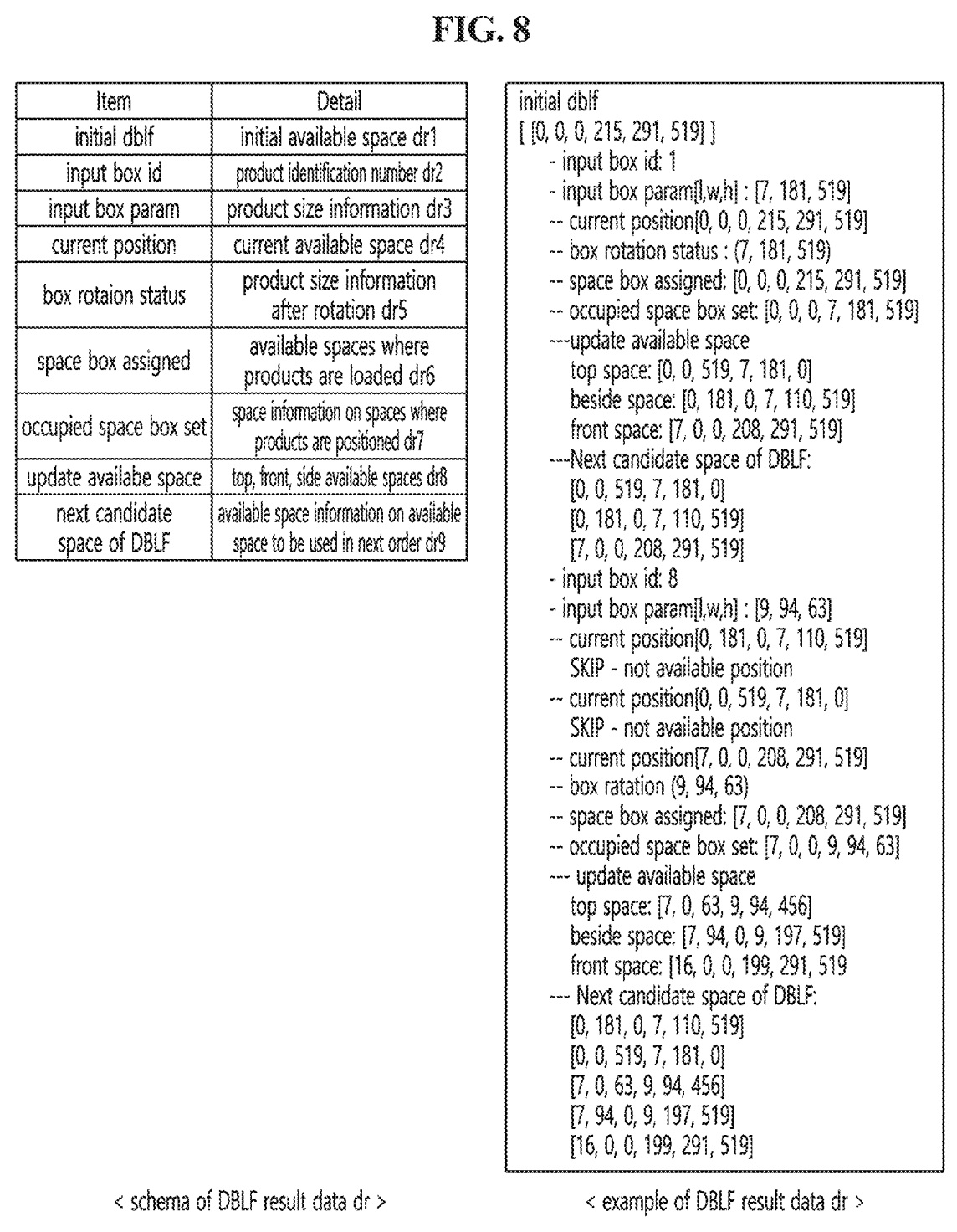

| Item | Detail |
|---|---|
| initial dblf | initial available space dr1 |
| input box id | product identification number dr2 |
| input box param | product size information dr3 |
| current position | current available space dr4 |
| box rotaion status | product size information after rotation dr5 |
| space box assigned | available spaces where products are loaded dr6 |
| occupied space box set | space information on spaces where products are positioned dr7 |
| update availabe space | top, front, side available spaces dr8 |
| next candidate space of DBLF | available space information on available space to be used in next order dr9 |

```
initial dblf
[ [0, 0, 0, 215, 291, 519] ]
    - input box id: 1
    - input box param[l,w,h] : [7, 181, 519]
    -- current position[0, 0, 0, 215, 291, 519]
    -- box rotation status : (7, 181, 519)
    -- space box assigned: [0, 0, 0, 215, 291, 519]
    -- occupied space box set: [0, 0, 0, 7, 181, 519]
    ---update available space
        top space: [0, 0, 519, 7, 181, 0]
        beside space: [0, 181, 0, 7, 110, 519]
        front space: [7, 0, 0, 208, 291, 519]
    ---Next candidate space of DBLF:
        [0, 0, 519, 7, 181, 0]
        [0, 181, 0, 7, 110, 519]
        [7, 0, 0, 208, 291, 519]
    - input box id: 8
    - input box param[l,w,h] : [9, 94, 63]
    -- current position[0, 181, 0, 7, 110, 519]
        SKIP - not available position
    -- current position[0, 0, 519, 7, 181, 0]
        SKIP - not available position
    -- current position[7, 0, 0, 208, 291, 519]
    -- box ratation (9, 94, 63)
    -- space box assigned: [7, 0, 0, 208, 291, 519]
    -- occupied space box set: [7, 0, 0, 9, 94, 63]
    --- update available space
        top space: [7, 0, 63, 9, 94, 456]
        beside space: [7, 94, 0, 9, 197, 519]
        front space: [16, 0, 0, 199, 291, 519
    --- Next candidate space of DBLF:
        [0, 181, 0, 7, 110, 519]
        [0, 0, 519, 7, 181, 0]
        [7, 0, 63, 9, 94, 456]
        [7, 94, 0, 9, 197, 519]
        [16, 0, 0, 199, 291, 519]
```

< schema of DBLF result data dr >          < example of DBLF result data dr >

FIG. 9A

| | | non-slicing section | | | slicing section | | |
|---|---|---|---|---|---|---|---|
| index | | 0 | 1 | 2 | 3 | 4 | 5 |
| pi1 | loading order | 3 | 5 | 1 | 0 | 2 | 4 |
| pi1 | rotation direction | 2 | 3 | 0 | 0 | 3 | 1 |
| pi2 | loading order | 4 | 0 | 2 | 1 | 5 | 3 |
| pi2 | rotation direction | 4 | 1 | 3 | 5 | 1 | 0 | copying

| | | | | | slicing section | | |
|---|---|---|---|---|---|---|---|
| index | | 0 | 1 | 2 | 3 | 4 | 5 |
| ci1 | loading order | | | | 0 | 2 | 4 |
| ci1 | rotation direction | | | | 0 | 3 | 1 |
| ci2 | loading order | | | | 1 | 5 | 3 |
| ci2 | rotation direction | | | | 5 | 1 | 0 |

FIG. 9B pi1 / pi2

| index | 0 | 1 | 2 | 3 | 4 | 5 |
|---|---|---|---|---|---|---|
| pi1 loading order | 3 | 5 | 1 | 0 | 2 | 4 |
| pi1 rotation direction | 2 | 3 | 0 | 0 | 3 | 1 |
| pi2 loading order | 4 | 0 | 2 | 1 | 5 | 3 |
| pi2 rotation direction | 4 | 1 | 3 | 5 | 1 | 0 | non-slicing section: indices 0, 1, 2 — slicing section: indices 3, 4, 5 ci1 / ci2

| index | 0 | 1 | 2 | 3 | 4 | 5 |
|---|---|---|---|---|---|---|
| ci1 loading order | 1 | 5 | 3 | 0 | 2 | 4 |
| ci1 rotation direction | 5 | 1 | 0 | 0 | 3 | 1 |
| ci2 loading order | 0 | 2 | 4 | 1 | 5 | 3 |
| ci2 rotation direction | 0 | 3 | 1 | 5 | 1 | 0 | copying copying is not executable due to overlapping with section having indices from 3 to 5 of already copied ci2 copying is not executable due to overlapping with section having indices from 3 to 5 of already copied ci1

FIG. 10A variation section

|  | index | 0 | 1 | 2 | 3 | 4 | 5 |
|---|---|---|---|---|---|---|---|
| pi1 | loading order | 1 | 5 | 3 | 0 | 2 | 4 |
|  | rotation direction | 5 | 1 | 0 | 0 | 3 | 1 | sorting in reverse order

|  | index | 0 | 1 | 2 | 3 | 4 | 5 |
|---|---|---|---|---|---|---|---|
| ci1 | loading order | 1 | 5 | 2 | 0 | 3 | 4 |
|  | rotation direction | 5 | 1 | 3 | 0 | 0 | 1 |

FIG. 10B variation section

| index | | 0 | 1 | 2 | 3 | 4 | 5 |
|---|---|---|---|---|---|---|---|
| pi1 | loading order | 1 | 5 | 3 | 0 | 2 | 4 |
| | rotation direction | 5 | 1 | 3 | 0 | 0 | 1 | changing in random

| index | | 0 | 1 | 2 | 3 | 4 | 5 |
|---|---|---|---|---|---|---|---|
| ci1 | loading order | 1 | 5 | 2 | 0 | 3 | 4 |
| | rotation direction | 5 | 1 | 0 | 0 | 1 | 1 |

FIG. 11

| Item | Detail |
|---|---|
| BOX SIZE | products loaded lr5 |
| CONVERGENCE OF GENERATION | evolution generation count information lr2 |
| Crowd Distance | Crowd Distance lr3 |
| Fitness | objective function values lr4 |
| Goods_in | products loaded lr5 |
| Goods_missing | products not loaded lr6 |
| Order | loading order lr7 |
| Rotation | rotation direction lr8 |
| Solution | product space coordinates lr9 |

< schema of loading result data lr >

```
==== TEST BOX_TYPE: minimal2
  ==== BOX SIZE: [20, 26, 16]
generation progress bar:  32% | ##############################6
=== CONVERGENCE ON GENERATION: 66 ====
generation progress bar:  32% | ##############################2
{ 'Crowd Distance' : 5000.226579877183,
    'Rank' : 1,
    'fitness' : [55.60000000000001, 100.0, 86.54, 71.17, 1, 5000.226579877183],
    'goods_in' : [0, 1, 2, 3, 4, 5]
    'goods_missing' : [ ],
    'order' : [4, 3, 2, 1, 0, 5],
    'rotation' : [0, 1, 5, 2, 1, 0],
    'solution' : {0: [9.0, 15.0, 0, 8.0, 9.0, 10.0],
              1: [0, 15.0, 0, 9.0, 10.0, 8.0],
              2: [9.0, 6.0, 0, 11.0, 9.0, 9.0],
              3: [0, 6.0, 0, 9.0, 9.0, 11.0],
              4: [0, 0, 0, 9.0, 6.0, 13.0],
              5: [9.0, 0, 0, 9.0, 6.0, 13.0],
```

< example of loading result data lr >

METHOD AND SYSTEM FOR GENERATING PRODUCT ARRANGEMENT INFORMATION BY USING PRODUCT VOLUME INFORMATION

CROSS REFERENCE TO RELATED APPLICATION

The present application claims priority to Korean Patent Application No. 10-2023-0110963, filed Aug. 24, 2023, the entire contents of which are incorporated herein for all purposes by this reference.

BACKGROUND OF THE INVENTION

Field of the Invention

The present disclosure relates to a method for generating arrangement information when products are loaded into a box by using volume information of the products, and a system for executing the method.

More particularly, the present disclosure relates to a method for obtaining information for most efficiently arranging a plurality of products in a box by using volume information of the products so as to gradually generate arrangement information on a loading order of the products, rotation directions of the products, spaces where the products are positioned, and the like when the plurality of products is loaded in the box or an empty three-dimensional space.

Description of the Related Art

Since the end of the 20th century, PCs have become widely available and high-speed communication networks have been established, so that various Internet services using the same have developed. In particular, the amount of product orders and deliveries via online is increasing every year and the number of cases of purchasing products or providing services non-face-to-face is gradually increasing due to the coronavirus infection that spread in year 2020. Accordingly, not only B2C logistics volume, but also B2B logistics volume is currently increasing every year.

In order to store or deliver a plurality of products, the products may first be packed and put into a box, or be loaded into a container box before sealing an opening and closing panel thereof. In this case, depending on the order in which the plurality of products is put into the box or container box and the positions in which the products are arranged in the box or container box, the number of loaded products and a volume ratio of the products occupying in the box or container box may vary.

As the number of products loaded in the box or container box increases, or the volume ratio of the products occupying in the box or container box increases, storage costs may be reduced by taking up less space when the products are stored, and effectiveness may be increased by delivering many products when logistics operations are performed. Accordingly, there arises a demand not only for an arrangement method capable of increasing the number of products that may be put into an empty three-dimensional space such as a box or container box or increasing a ratio of the volume occupied by the products but also a method that may generate product arrangement information at that time of arrangement.

SUMMARY OF THE INVENTION

An objective of the present disclosure is to solve the above problems and to provide a method for generating product arrangement information when a plurality of products is loaded in a box or an empty three-dimensional space by using volume information of the products, and a system for executing the method.

In order to achieve the above objective, in an exemplary embodiment of the present disclosure, there is provided a method for generating product arrangement information by using product volume information, the method including: an initial solution set creation step of generating a plurality of first sample objects having randomly generated loading order information and rotation direction information from product specification data including product size information and product rotation direction count information; and an arrangement information generation step of crossing a pair of the first sample objects with each other to generate a plurality of second sample objects, and selecting the plurality of first or second sample objects in order of priority so as to be reset as the first sample objects.

In the exemplary embodiment, the method may further include, before the initial solution set creation step, a data input step of receiving input of box specification data and the product specification data, wherein the box specification data may include: box name information for identifying a box from other boxes; box size information for representing a length for each dimension; and box dimension information for setting dimensions in vertical, horizontal, and height directions.

In the exemplary embodiment, in the initial solution set creation step, the loading order information may be generated by randomly selecting numbers from 0 to (the number of products included in the product specification data−1) one by one without duplication, and the rotation direction information may be generated by randomly selecting numbers from 0 to (the number of product rotation directions by product−1) for each product.

In the exemplary embodiment, in the arrangement information generation step, DBLF result data including coordinate information on coordinates at which products are positioned within the box may be generated when the products are loaded into the box according to a deepest bottom left fill (DBLF) packing method by using the loading order information and the rotation direction information of the first sample objects before crossing the pair of the first sample objects with each other.

In the exemplary embodiment, in the arrangement information generation step, one or more objective functions may be performed by using the coordinate information on the coordinates at which products included in the DBLF result data are positioned in the box after generating the DBLF result data.

In the exemplary embodiment, the one or more objective functions may include: a first objective function for calculating a ratio of volumes of all the products loaded in the box to a volume of the box; a second objective function for calculating a value obtained by dividing the number of the products loaded in the box by the number of products included in the product specification data; a third objective function for calculating a ratio of bottom areas of products in contact with a bottom of the box to a bottom area of the box; and a fourth objective function for calculating a value obtained by dividing the volume of all the products loaded in the box by the volume of products having maximum edge lengths.

In the exemplary embodiment, in the arrangement information generation step, in the generating of the plurality of second sample objects by crossing the pair of first sample objects with each other, slicing sections are randomly determined within a range of the number of products, information included in slicing sections of the first sample objects may be copied to slicing sections of the second sample objects corresponding to the first sample objects, and information not overlapped with information included in the slicing sections of the second sample objects may be sequentially searched from non-slicing sections of the first sample objects so as to be copied to non-slicing sections of the second sample objects not corresponding to the first sample objects.

In the exemplary embodiment, in the arrangement information generation step, variation sections may be randomly determined within the range of the number of products, pieces of the loading order information included in variation sections of the second sample objects may be sorted in a reverse direction, and the rotation direction information included in the variation sections of the second sample objects may be randomly changed.

In the exemplary embodiment, in the selecting of the plurality of first to second sample objects according to the priority, output values of one or more objective functions may be calculated when products are arranged by using the first and second sample objects, Pareto front levels and crowding distance values of the plurality of first and second sample objects may be calculated from the values of the one or more objective functions, and the plurality of first and second sample objects may be selected in order of increasing the Pareto front levels or in order of increasing the crowding distance values in a case where the Pareto front levels are same with each other.

In the exemplary embodiment, in a case of the number of objects whose loading order information and rotation direction information are all identical among the plurality of first and second sample objects selected in the arrangement information generation step, when the number of the identical objects is less than a threshold identical object number, the arrangement information generation step may be performed again, and when the number of the identical objects is greater than or equal to the threshold identical object number, loading result data including coordinate information on coordinates at which products are positioned within the box may be generated when the products are loaded into the box according to a DBLF packing method by using the loading order information and rotation direction information of an object having a highest pareto front level or having a largest crowding distance value with a case where Pareto front levels are same.

In another exemplary embodiment of the present disclosure, there is provided a system for generating product arrangement information by using product volume information, wherein the system may be configured to receive input of box specification data including box size information and input of product specification data including product size information and product rotation direction count information, generate a plurality of first sample objects that includes loading order information randomly generated from the number of products included in the product specification data and includes rotation direction information randomly generated from the product-specific product rotation direction count information, generate a plurality of second sample objects by crossing a pair of the first sample objects with each other, select the plurality of first and second sample objects in order of priority so as to be reset as the first sample objects, and generate coordinate information on coordinates at which the products are positioned within a box from the loading order information and the rotation direction information of the selected objects.

In another exemplary embodiment, in a case of the number of objects whose loading order information and rotation direction information are all identical among the plurality of selected objects, when the number of the identical objects is less than a threshold identical object number, an operation of selecting the plurality of first and second sample objects according to the priority so as to be reset as the first sample objects may be performed again, and when the number of the identical objects is greater than or equal to the threshold identical object number, the coordinate information on the coordinates at which the products may be positioned within the box is generated from the loading order information and rotation direction information of the selected objects.

According to the present disclosure, the number of products loaded into a box or an empty three-dimensional space and density within the box or three-dimensional space may be increased, thereby reducing costs when the products are stored or logistics operations are performed.

BRIEF DESCRIPTION OF THE DRAWINGS

FIGS. 4A and 4B are views briefly illustrating schemas and data of box specification data and product specification data, which are input to the system in the exemplary embodiment of the present disclosure.

FIG. 5 is a view briefly illustrating a schema and data of sample object data in the exemplary embodiment of the present disclosure.

FIG. 7A is a view briefly illustrating a standard for loading a product into a box according to a DBLF packing method in the exemplary embodiment of the present disclosure.

FIG. 7B is a view briefly illustrating each available space when the product is loaded into the box.

FIG. 8 is a view briefly illustrating DBLF result data and a schema thereof in the exemplary embodiment of the present disclosure.

FIGS. 9A and 9B are views briefly illustrating an information exchange process in a sample object crossing step in the exemplary embodiment of the present disclosure.

FIGS. 10A and 10B are views briefly illustrating an information change process in a sample object variation step in the exemplary embodiment of the present disclosure.

FIG. 11 is a view briefly illustrating a schema and data of loading result data output by the system in the exemplary embodiment of the present disclosure.

DETAILED DESCRIPTION OF THE INVENTION

Figure 1:
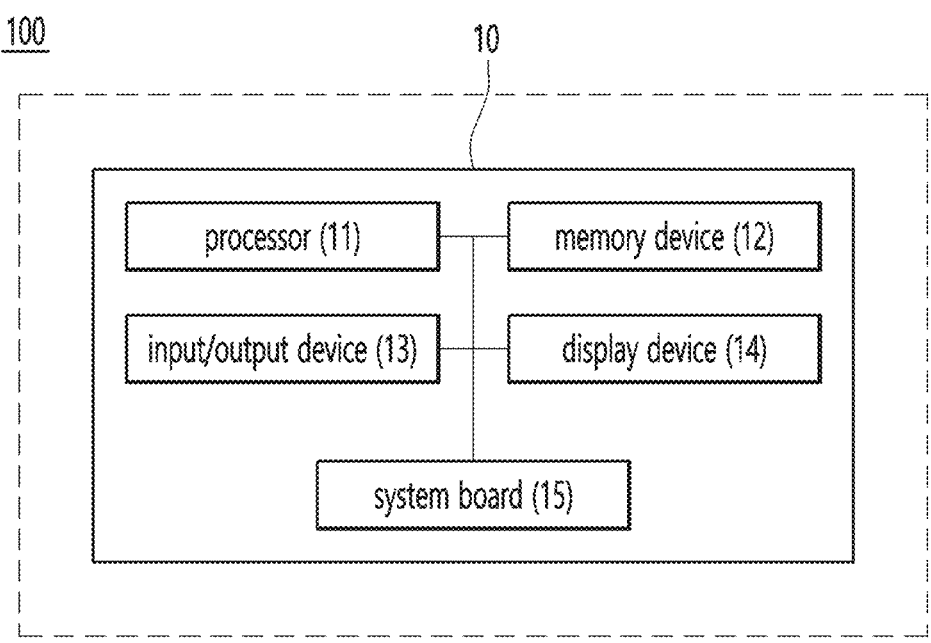
FIG. 1 is a block diagram briefly illustrating a system for generating product arrangement information by using product volume information according to an exemplary embodiment of the present disclosure.

FIG. 1 is a block diagram briefly illustrating a system for generating product arrangement information by using product volume information according to an exemplary embodiment of the present disclosure.

The system 100 for generating product arrangement information by using product volume information according to the exemplary embodiment of the present disclosure may be a single computing device or a set of a plurality of computing devices. Alternatively, in the single computing device or the plurality of computing devices, the system 100 may be a component to execute a method for calculating product arrangement information by using product volume information according to the exemplary embodiment of the present disclosure.

The computing device 10 included in or including the system 100 includes a processor 11, a memory device 12, an input/output device 13, a display device 14, and a system board 15.

The processor 11 performs an operation of reading and changing data input into the system 100 or generating data output to the outside. In addition, the processor 11 interprets and processes computer-readable instructions that execute the method according to the exemplary embodiment of the present disclosure. The processor 11 may be a microprocessor including: a controller for interpreting instructions and generating control signals for execution; an arithmetic and logic unit for executing arithmetic and logical operation instructions; a register for storing a plurality of instructions, a position of a next instruction to be executed, and data to be input or output; a cache memory for temporarily storing data exchanged between the processor 11 and the memory device 12; and a system bus, which is a passage through which data moves within the processor 11. For example, the processor may be any one of a central processing unit, a graphic processing unit, or a digital signal processor.

The memory device 12 stores data that is processed or input/output within the system 100. In addition, the memory device 12 stores computer-readable instructions for executing the method according to the exemplary embodiment of the present disclosure. The memory device 12 may include a main memory device and an auxiliary memory device. The main memory device may include a random access memory device or a flash memory device. For example, the main memory may include, as the random access memory device, one or more of a static RAM (SRAM), a dynamic RAM (DRAM), a magneto-resistive RAM (MRAM), a spin-transfer torque magneto-resistive RAM (STT-MRAM), a phase RAM (PRAM), a resistive RAM (RRAM), and a ferroelectric RAM (FeRAM). The auxiliary storage device may include one or more of a hard disk drive, a solid state drive (SSD), an optical disc drive, and a magnetic tape.

The input/output device 13 receives input of data into the system 100 and outputs data to the outside. In addition, the input/output device 13 receives input of computer-readable instructions that execute the method according to the exemplary embodiment of the present disclosure. The input/output device may include an external input/output terminal and a driver device for processing the external input/output terminal. For example, the external input/output terminal may include a serial port, a parallel port, a small computer system interface (SCSI) port, a universal serial bus (USB) port, an IEEE 1394 port, an external serial advanced technology attachment (e-SATA) port, and a thunderbolt port. In addition, the input/output device may include a network interface controller, and the network interface controller may be connected to a local area network (LAN) based on Ethernet in a wired manner, or may be connected to a wireless local area network (WLAN) based on Wi-Fi in a wireless manner.

The display device 14 may display data processed by the processor 11 or stored in the memory device 12. The display device 14 may be a display or a printing device.

The system board 15 connects the processor 11, the memory device 12, the input/output device 13, and the display device 14 to each other, and provides a path for data processed by the system 100. The system board 15 may include an address bus, an instruction bus, a data bus, a chipset device for controlling a bus, and a power system.

The system 100 may be connected to a terminal device located outside the system 100, a personal area network (PAN), a local area network (LAN), a metropolitan area network (MAN), and a wide area network (WAN), and may receive data from an external terminal device or transmit data to the external terminal device by using a data communication protocol such as a transmission control protocol/internet protocol (TCP/IP), a server message block (SMB), a common internet file system (CIFS), and an network file system (NFS).

Figure 2:
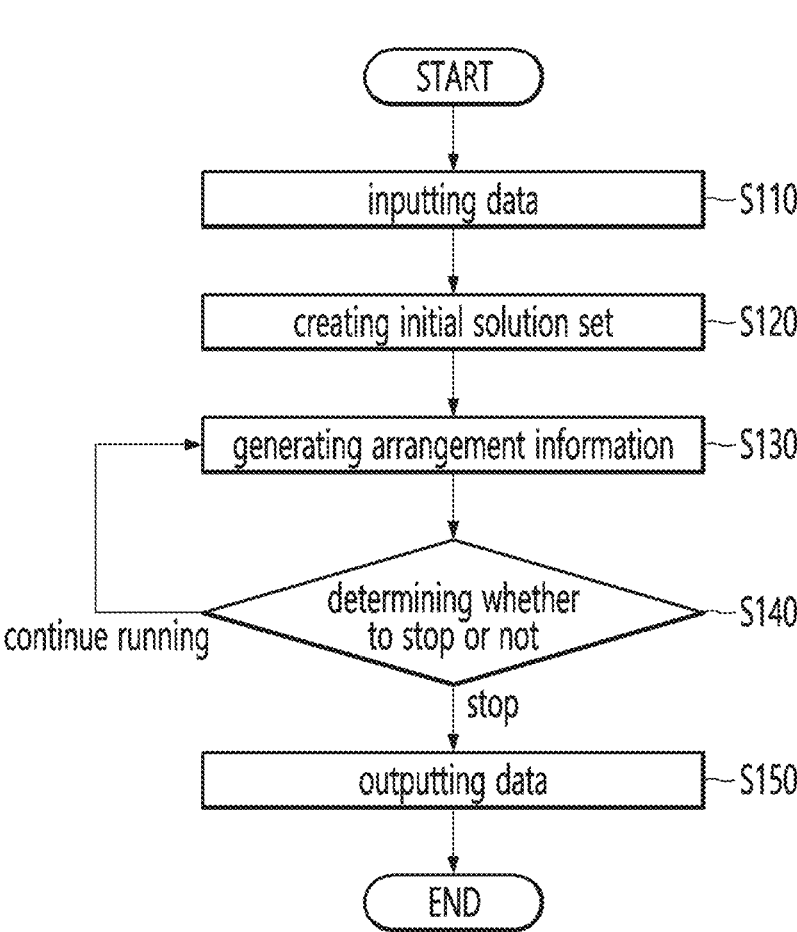
FIG. 2 is a flowchart briefly illustrating a method for generating product arrangement information by using product volume information according to the exemplary embodiment of the present disclosure.

FIG. 2 is a flowchart briefly illustrating the method for generating product arrangement information by using product volume information according to the exemplary embodiment of the present disclosure.

The box packing method using product volume information according to the exemplary embodiment of the present disclosure may include each of a data input step S110, an initial solution set creation step S120, an arrangement information generation step S130, a whether to stop determination step S140, and a data output step S150. Each step may be stored as computer-readable instructions in a recording medium, and the system 100 may execute each step by reading the instructions from the recording medium.

In the data input step S110, the system 100 receives input of box specification data and product specification data.

Figure 3A:
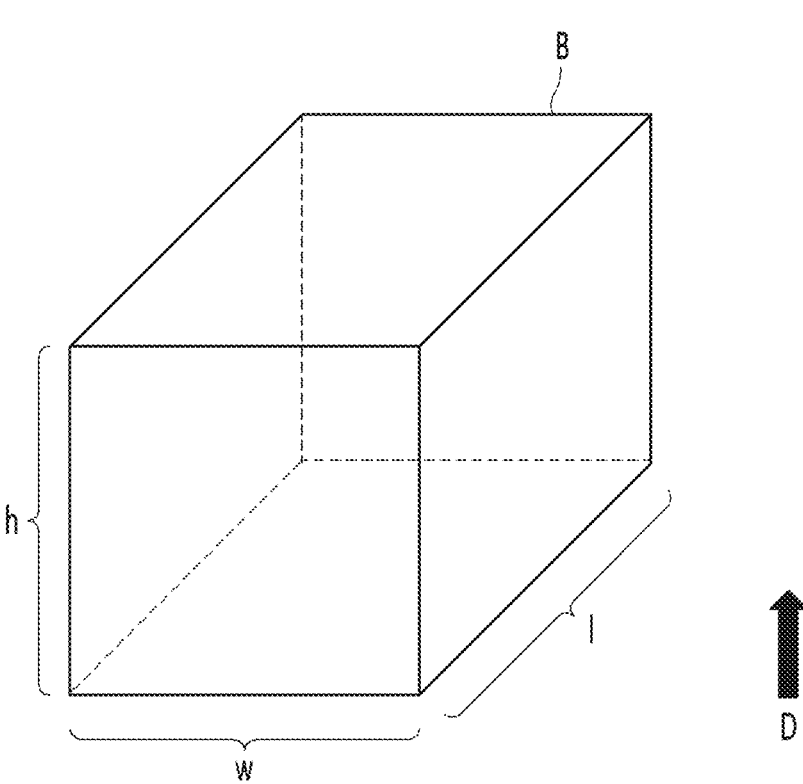
FIG. 3A is a perspective view briefly illustrating a box in the exemplary embodiment of the present disclosure.
Figure 3B:
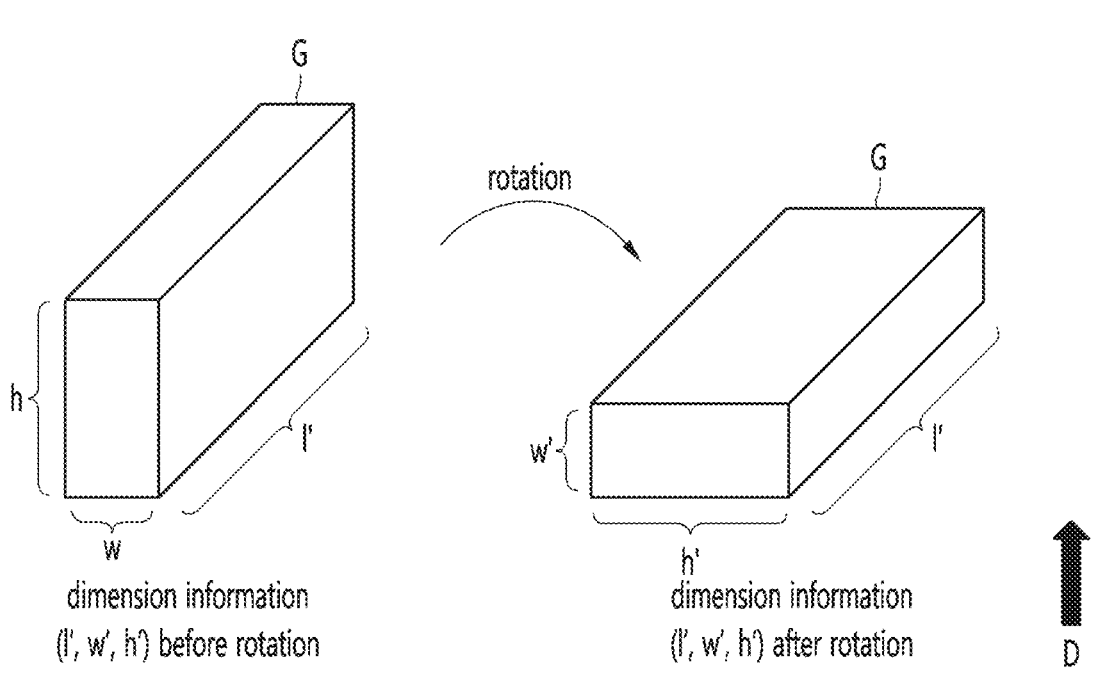
FIG. 3B is a view briefly illustrating dimension information after a product is rotated in the exemplary embodiment of the present disclosure.

FIG. 3A is a perspective view briefly illustrating a box in the exemplary embodiment of the present disclosure. FIG. 3B is a view briefly illustrating dimension information after a product is rotated in the exemplary embodiment of the present disclosure. FIGS. 4A and 4B are views briefly illustrating schemas and data of box specification data and product specification data input to the system in the exemplary embodiment of the present disclosure.

In the exemplary embodiment of the present disclosure, a box B is a three-dimensional item having an empty interior space and may accommodate one or more products. The box B may have the shape of a rectangular parallelepiped or cube, but is not limited to a specific shape. For example, the box B may be a rectangular paper box, a plastic box, or a container box made of metal.

In a case where a box B has the shape of a rectangular parallelepiped or cube, dimensions thereof may be defined such that relative to a direction D a person is facing in FIG. 3A, a length in a vertical direction is 1, a length in a horizontal direction is w, and a length in a height direction is h.

Box specification data i1 represents volume information of a box B. The box specification data i1 may include box name information i11 for identifying one box from other boxes, box size information i12 for representing a length for each dimension, and box dimension information i13 for setting a dimension for each direction such as a vertical, horizontal, or height direction, and may additionally include box price information i14. In the box size information i12, the unit of length for each dimension may be any one of cm, m, inch, feet, yard, and mile.

The box specification data i1 may be stored in the format of JavaScript Object Notation (JSON), YAML Ain't Markup Language (YAML), or extensible Markup Language (XML).

For example, in a case where a box whose name is "large" has a length of 35 cm in a vertical direction l, a length of 50 cm in a horizontal direction w, a length of 25 cm in a height direction h, and a price of 1,650 Korean won, as shown in FIG. 4A, "box_name" which is box name information i11 is expressed as "large", "box_size" which is box size information i12 is expressed as [35, 50, 25], and "dimension" which is box dimension information i13 is expressed as ["l", "w", "h"], and such information may be stored in the JSON format.

In the exemplary embodiment of the present disclosure, the order in which a plurality of products is loaded is determined for each box having five specifications, such as "minimal1", "minimal2", "minimal3", "medium", and "large", but is not limited thereto and the order in which the plurality of products is loaded may be determined even for boxes having different specifications. In addition, lengths in the vertical, horizontal, and height directions of the five boxes having specifications such as "minimal1", "minimal2", "minimal3", "medium", and "large", and other boxes are not limited to the specific values shown in FIG. 4A.

In the exemplary embodiment of the present disclosure, a product may be a tangible object in a shape of a rectangular parallelepiped or cube containing contents. However, the shape of the product is not limited to a specific form.

Product specification data i2 represents volume information for each of one or more products. The product specification data i2 may include: product size information i21 for representing a length for each dimension of a product; and product rotation direction count information i22 for representing the number of rotatable directions for each product. For the plurality of products, the product specification data i2 may include the product size information i21 and product rotation direction count information i22.

In the product size information i21, the unit of length for each dimension may be any one of cm, m, inch, feet, yard, and mile.

The product volume information may be generated by multiplying all the dimensions defined in the product size information i21. For example, the product volume information may be generated by multiplying all lengths of a product in the vertical, horizontal, and height directions.

Alternatively, the product specification data i2 may include information on a space where a product is positioned on a coordinate system. For example, assuming that a vertex of a product is positioned at the origin on a three-dimensional Cartesian coordinate system, the product specification data i2 may include coordinate information for each vertex.

The product rotation direction count information i22 may represent the number of rotations that are rotatable clockwise or counterclockwise for each of three axes in a three-dimensional Cartesian coordinate system. In general, since there are no restrictions on rotating a product clockwise and counterclockwise for each of the three axes, rotation directions may be six (i.e., 3 axes×2 directions (clockwise and counterclockwise)).

Alternatively, the product rotation direction count information i22 may represent the number of cases where edges l', w', and h' in vertical, horizontal, and height directions may be changed relative to a direction D a person is facing in FIG. 3.

For example, relative to the direction D the person is facing, when an edge in the height direction of a product is changed to an edge in the horizontal direction (h'→w'), an edge in the horizontal direction of the product is changed to an edge in the height direction (w'→h'), dimension information may be changed from (l', w', h') to (l', h', w'). Assuming that edges of the vertical, horizontal, and height directions respectively have lengths of (l', w', h') before the product is rotated, the lengths of the edges of the vertical, horizontal, and height directions may be changed to any one of (l', h', w'), (w', l', h'), (w', h', l'), (h', l', w'), and (h', w', l') depending on a rotation direction after the product is rotated.

The product specification data i2 may be stored in the format of JSON, YAML, or XML.

For example, as shown in FIG. 4B, six products rotatable in six directions and whose lengths in the vertical direction l', the horizontal direction w', and the height direction h' are respectively [9, 8, 10], [9, 8, 10], [9, 9, 11], [9, 9, 11], [9, 6, 13], and [9, 6, 13] may be stored in a JSON format by representing product size information i21 "goods" by [9, 8, 10], [9, 8, 10], [9, 9, 11], [9, 9, 11], [9, 6, 13], and [9, 6, 13] and representing product rotation direction count information i22 "rotations" in order as [6, 6, 6, 6, 6, 6] for each of the six products.

In the data input step 110, the system 100 may further receive input of hyperparameters serving as comparison standards in each step. As the hyperparameters, the system 100 may further receive: box margin information in consideration of spaces occupied by cushioning items or product packing items within a box; solution set size information that is the number of sample objects and generated in the initial solution set creation step S120; maximum evolution generation count information regarding an iteration count in the arrangement information generation step S130; length information of slicing sections when sample objects are crossed; length information of variation sections when the sample objects are changed; identical object count threshold ratio information regarding a ratio of the number of child objects having the same information as each other to a plurality of child objects generated in the whether to stop determination step S140; etc. Alternatively, the system 100 may receive input of the hyperparameters before the data input step 110, or may be in a state of storing the hyperparameters in advance.

In the initial solution set creation step S120, the system 100 randomly generates sample object data including a plurality of sample objects. An object is data that includes information on an order in which products are loaded into a box and information on directions in which the products are rotated when loaded into the box. The system 100 may generate a plurality of randomly generated sample objects having loading order information and rotation direction information from product specification data having product count information and product rotation direction count information.

FIG. 5 is a view briefly illustrating a schema and data of sample object data in the exemplary embodiment of the present disclosure.

Sample object data si includes each object having a pair of pieces of loading order information si1 representing product number information of products loaded in order in a box and rotation direction information si2 representing rotation direction information of the products loaded in the order. The sample object data si may include a plurality of sample objects. The sample object data si may be stored in the format of JSON, YAML, or XML. A number in each column in the rotation direction information si2 may represent a rotation direction of a product corresponding to a number positioned in the same column in the loading order information si1.

The system 100 may generate loading order information si1 of sample objects by randomly selecting numbers from 0 to (the number of products included in the product specification data−1) one by one without duplication. In addition, the system 100 may generate rotation direction information si2 of the sample objects by randomly selecting numbers from 0 to (the number of product rotation directions by product−1) for each product.

For example, when product 0, product 5, product 3, product 1, product 2, and product 4 are loaded into a box in this order, loading order information si1 may be expressed as [0, 5, 3, 1, 2, 4] as shown in FIG. 5. In addition, in a three-dimensional Cartesian coordinate system, when a clockwise rotation direction of a first axis is indicated by "0", a counterclockwise rotation direction of the first axis is indicated by "1", a clockwise rotation direction of a second axis is indicated by "2", a counterclockwise rotation direction of the second axis is indicated by "3", a clockwise rotation direction of a third axis is indicated by "4", and a counterclockwise rotation direction of the third axis is indicated by "5", rotation direction information si2 may be expressed as [3, 4, 4, 5, 0, 1] in a case where a rotation direction of product 0 is counterclockwise on the second axis, a rotation direction of product 5 is clockwise on the third axis, a rotation direction of product 3 is clockwise on the third axis, a rotation direction of product 1 is counterclockwise on the third axis, a rotation direction of product 2 is clockwise on the first axis, and a rotation direction of product 4 is counterclockwise on the first axis. In addition, the number of columns of the loading order information si1 and rotation direction information si2 may be equal to the number of products included in the product specification data i2.

The system 100 may randomly generate loading order information si1 according to the number of products. For example, in a case where the number of products included in the product specification data i2 is 6, a permutation of product numbers 0 to 5 may be randomly generated.

In addition, the system 100 may randomly generate rotation direction information si2 of the sample object data si according to product rotation direction count information i22 of the product specification data i2. For example, when a counting number recorded in the product rotation direction count information i22 of the product specification data i2 is six, rotation direction information si2 may be randomly generated in a range of 0 to 5 for each product.

The system 100 may generate a plurality of objects each having a pair of pieces of loading order information si1 and rotation direction information si2, and generate sample object data si which is an initial solution set. In this case, the system 100 may generate sample objects as many as a number based on solution set size information set as a hyperparameter.

In the arrangement information generation step S130, the system 100 generates the product loading order information and product-specific rotation direction information again by using the sample object data si, and calculates suitability of generated values. The system 100 may generate a plurality of child sample objects by crossing a pair of parent sample objects with each other to generate a plurality of child sample objects, vary the child sample objects, and then select a plurality of parent and child sample objects according to priority so as to be reset as parent sample objects.

Figure 6:
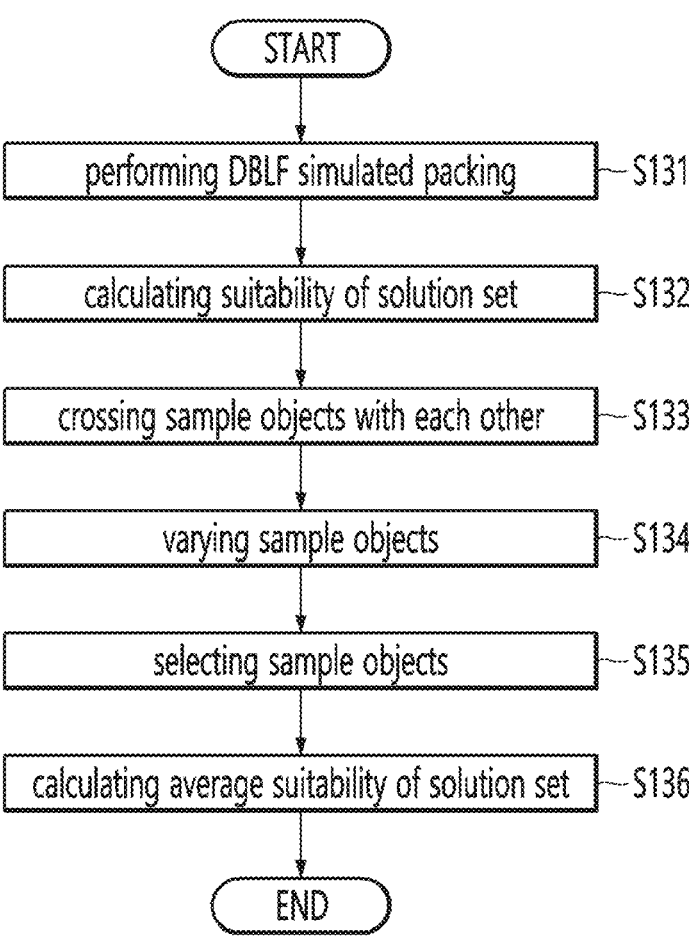
FIG. 6 is a flowchart briefly illustrating detailed steps of an arrangement information generation step in the exemplary embodiment of the present disclosure.

FIG. 6 is a flowchart briefly illustrating detailed steps of the arrangement information generation step in the exemplary embodiment of the present disclosure.

The arrangement information generation step S130 may include each of a DBLF simulated packing step S131, a solution set suitability calculation step S132, a sample object crossing step S133, a sample object variation step S134, a sample object selection step S135, and a solution set average suitability calculation step S136.

In the DBLF simulated packing step S131, each time a product is loaded into a box according to the deepest bottom left fill (DBLF) method, the system 100 calculates by simulation to provide space information on a space occupied by the product and available space information on an available space capable of accommodating other products inside the box. The system 100 may generate DBLF result data including coordinates at which the product is positioned within the box when the product is loaded into the box according to the DBLF method using loading order information and rotation direction information for each sample object included in the sample object data si. The system 100 may reflect margin information of the box that is set as a hyperparameter and generate DBLF result data when the product is loaded into the box according to the DBLF method.

FIG. 7A is a view briefly illustrating a standard for loading a product into a box according to the DBLF packing method in the exemplary embodiment of the present disclosure, and FIG. 7B is a view briefly illustrating each available space when the product is loaded into the box.

As shown in FIG. 7A, in the deepest bottom left fill (DBLF) packing method, firstly, a product is loaded to be positioned far away from an opening ap of a box B (deepest), secondly, the product is loaded to be positioned close to the bottom of the box B (bottom), and thirdly, the product is loaded to be positioned close to the left when the opening ap is viewing from the opposite side thereof (left), thereby loading a product G by priorities.

As shown in FIG. 7B, when a product G is loaded into a box B, an available space capable of accommodating other products may be generated. A top available space is an empty space adjacent to the loaded product G in a height direction, a front available space is an empty space adjacent to the loaded product G in a vertical direction, and a side available space is a space adjacent to the loaded product G in a horizontal direction.

Coordinates of a vertex vp of the box B, the vertex being a highest priority arrangement position according to the DBLF packing method, on a three-dimensional Cartesian coordinate system are [pos[0], pos[1], pos[2]], and when lengths of the loaded product G in the vertical, horizontal, and height directions are defined as l', w', and h', and lengths of the box B in the vertical, horizontal, and height directions are defined as l, w, and h, each available space may be positioned at a vertex having coordinates shown in Table 1 below, and may have the lengths in the vertical, horizontal, and height directions.

11

TABLE 1

| Available space | Coordinate | | | Length | | |
|---|---|---|---|---|---|---|
| | Vertical direction | Horizontal direction | Height direction | Length | Width | Height |
| Top | pos[0] | pos[1] | pos[2] + h' | l' | w' | h − h' |
| Front | pos[0] + l' | pos[1] | pos[2] | l − l' | w | h |
| Side | pos[0] | pos[1] + w' | pos[2] | l | w − w' | h |

FIG. 8 is a view briefly illustrating DBLF result data and a schema thereof in the exemplary embodiment of the present disclosure. The system 100 may generate the DBLF result data dr each time when a product loading position is determined in the DBLF simulated packing step S131. Alternatively, the system 100 may add a DBLF result calculated for each loaded product to one piece of DBLF result data dr.

In the DBLF result data dr, initial dblf dr1 indicates an initial available space in a box. For example, in a three-dimensional Cartesian coordinate system, first three numbers [0, 0, 0] respectively represent coordinates in vertical, horizontal, and height directions where the initial available space is positioned, and last three numbers [0, 0, 0] respectively represent lengths in the vertical, horizontal, and height directions of the initial available space.

Input box id dr2 indicates identification number information of a product being loaded, and input box param dr3 indicates length, width, and height lengths, which are product size information of the product being loaded.

Current position dr4 indicates coordinates and a size of an available space to load a current product. First three numbers indicate coordinates in vertical, horizontal, and height directions of the available space, and last three numbers indicate lengths in the vertical, horizontal, and height directions of the available space.

Box rotation status dr5 indicates length information for each dimension after a product being loaded is rotated. For example, when the product whose lengths in vertical, horizontal, and height directions are respectively [7, 181, 519] is rotated 90 degrees relative to the height direction, lengths in the vertical, horizontal, and height directions may be represented by changing the previous lengths to [181, 7, 519].

Space box assigned dr6 indicates coordinates and a size of an available space where a product is to be loaded. First three numbers indicate coordinates in vertical, horizontal, and height directions of the available space, and last three numbers indicate lengths in the vertical, horizontal, and height directions of the available space.

Occupied space box set dr7 indicates coordinates at which a product being loaded is positioned within a box. First three numbers indicate coordinates of a first vertex of the product being loaded, and last three numbers indicate coordinates of a second vertex positioned diagonally from the first vertex.

Update available space dr8 indicates coordinates and size information of top, front, and side available spaces.

Next candidate space of DBLF r9 indicates a list of available spaces where a product may be loaded next, and may be the same as the coordinates and size information of the top, front, and side available spaces. That is, the product to be loaded next may be positioned in one of the top, front, and side available spaces.

In the solution set suitability calculation step S132, the system 100 calculates suitability of sample objects according to arrangement of products loaded in a box. The system 100 may calculate the suitability of the sample object from one or more objective functions that are calculated according to the volume and number of products, a bottom surface area of each product, and loading types the products.

The system 100 may execute one or more objective functions. For example, a first objective function may calculate a ratio of volumes of all products loaded in a box to a volume of the box (i.e., the ratio of the volume of all the products/the volume of the box). In addition, a second objective function may calculate a value obtained by dividing the number of the products loaded in the box by the total number of products included in product and product specification data (i.e., the ratio of the number of the loaded products/the total number of the products). In addition, a third objective function may calculate a ratio of a sum of bottom areas of the products in contact with the bottom of the box to an occupied bottom area of the box (i.e., the ratio of the sum of the bottom areas of the products positioned at the bottom of the box/the bottom area of the box). In addition, a fourth objective function may calculate a value obtained by dividing the volume of all the products loaded in the box by a volume of products having maximum edge lengths (i.e., the ratio of the volume of all the products/the volume of the products having the maximum edge lengths). In addition, the system 100 may calculate one suitability by adding up all values obtained by multiplying corresponding weights to output values of the first to fourth objective functions.

In the sample object crossing step S133, the system 100 selects a pair of sample objects from sample object data si, causes the pair of sample objects to exchange product number information included in loading order information si1 with each other, and then causes the pair of sample objects to exchange product rotation direction information included in rotation direction information si2 with each other. The system 100 may perform such an operation on a plurality of pairs of sample objects in the sample object data si.

FIGS. 9A and 9B are views briefly illustrating an information exchange process in the sample object crossing step in the exemplary embodiment of the present disclosure.

The system 100 randomly determines slicing sections within a range of the number of products, and copies information included in slicing sections of parent sample objects to slicing sections of child sample objects corresponding to the parent sample objects. In addition, the system 100 may sequentially search for information not overlapped with information included in the slicing sections of the child sample objects, starting from non-slicing sections of the parent sample objects, and copy the non-overlapped information to the non-slicing sections of the child sample objects that do not correspond to the parent sample objects. The system 100 may determine lengths of the slicing sections according to the slicing section length information that is set as a hyperparameter.

The system 100 randomly selects two sample objects among a plurality of sample objects from the sample object data si to make the two sample objects as a pair thereof, and then defines the two sample objects in pair as a first parent object pi1 and a second parent object pi2.

The system 100 randomly determines two slicing indices within a range of the number of products to be loaded in a box. For example, when six products are loaded into the box, each product may have a number from 0 to 5, and the system 100 may randomly select 3 and 5 among the numbers and determine the selected numbers as slicing indices. In addition, in loading order information and rotation direction information of the first parent object pi1 and the second parent object pi2, each section having indices 3 to 5 is defined as a slicing section, and each section having indices 0 to 2 is defined as a non-slicing section.

The system 100 copies in order the slicing sections of the parent objects pi1 and pi2 to those of the child objects ci1 and ci2, and crosses values not overlapped with the values in each copied slicing section with each other so as to copy the crossed values to the child objects ci2 and ci1. That is, the system 100 respectively copies the values in the slicing sections of the first and second parent objects pi1 and pi2 to those of the first and second child objects ci1 and ci2. Then, starting from the non-slicing sections of the first and second parent objects pi1 and pi2, the system 100 copies the non-overlapped values to the second and first child objects ci2 and ci1 in order.

For example, as shown in FIG. 9A, the system 100 copies the slicing section of the first parent object pi1 to the section having indices 3 to 5 of the first child object ci1, and copies the slicing section of the second parent object pi2 to the section having indices 3 to 5 of the second child object ci2.

In addition, as shown in FIG. 9B, starting from a start index 0 of the non-slicing section of the first parent object pi1, the system 100 sequentially copies, to the not-yet-copied section having indices 0 to 2 in the second child object ci2, values not overlapped with the loading order and rotation direction values positioned in the already-copied section having indices 3 to 5 in the second child object ci2. That is, since all the loading order and rotation direction values positioned in the section having indices from a start index of the non-slicing section 0 to 2 in the first parent object pi1 are overlapped with the values already copied to the section having indices 3 to 5 in the second child object ci2, the loading order and rotation direction values positioned in the section having indices from the next start index 3 to 5 in the first parent object pi1 are sequentially copied to the section having indices from 0 to 2 in the second child object ci2. Likewise, since all the loading order and rotation direction values positioned in the section having indices from a start index of the non-slicing section 0 to 2 in the second parent object pi2 are overlapped with the values already copied to the section having indices 3 to 5 in the first child object ci1, the loading order and rotation direction values positioned in the section having indices from the next start index 3 to 5 in the second parent object pi2 are sequentially copied to the section having indices from 0 to 2 in the first child object ci1.

In the sample object variation step S134, the system 100 changes the product number information included in the loading order information and the product rotation direction information included in the rotation direction information in the child objects ci1 and ci2.

FIGS. 10A and 10B are views briefly illustrating an information change process in the sample object variation step in the exemplary embodiment of the present disclosure.

The system 100 randomly determines two variation indices in the loading order information of the child objects ci1 and ci2, the variation indices being generated in the sample object crossing step S133. For example, when six products are loaded into a box, the products may have a number from 0 to 5, and the system 100 may randomly select 2 and 4 so as to be determined as variation indices. In addition, in the loading order information, a section having indices 2 to 4 is defined as a variation section, and a section having indices 0, 1, and 5 is defined as a non-variation section. The system 100 may determine a length of the variation section according to variation section length information set as a hyper-parameter.

The system 100 may sort product numbers in a reverse direction in the variation section of the loading order information. For example, as shown in FIG. 10A, when the product numbers are "1, 5, 3" in a variation section of the loading order information of the first child object ci1, the system 100 may sort the product numbers in an order of "3, 5, 1".

The system 100 may randomly change rotation direction information of each product in rotation direction information of the child objects ci1 and ci2. For example, as shown in FIG. 10B, in the rotation direction information of the first child object ci1, the system 100 changes rotation direction information of a product positioned at index 2 from 3 to 0, and changes rotation direction information of a product positioned at index 4 from 0 to 1.

The system 100 calculates a ranking according to one or more objective function values corresponding to the parent objects pi1 and pi2 and the child objects ci1 and ci2 in the sample object selection step S135, and then selects objects to be parent objects in the next arrangement information generation step S130. One or more objective function values corresponding to parent objects pi1 and pi2 and child objects ci1 and ci2 may be values output by inputting product arrangement information generated when DBLF packing is performed according to the loading order information and rotation direction information of the parent objects pi1 and pi2 or child objects ci1 and ci2 to one or more objective functions.

When products are loaded in a box according to the loading order information and rotation direction information of the child objects ci1 and c2*i* changed in the sample object variation step S134, the system 100 calculates output values by inputting product arrangement information to one or more objective functions. The objective functions may be the first to fourth objective functions used in the solution set suitability calculation step S132.

The system 100 uses the one or more objective function values corresponding to the parent objects pi1 and pi2 and child objects ci1 and ci2 so as to obtain the number np of other sample objects that are Pareto superior to a certain sample object and a set Sp of other sample objects for which the sample object is Pareto superior, and calculate Pareto front levels.

For example, as shown in Table 2 below, when products are loaded in a box according to the loading order information and rotation direction information of the parent objects pi1 and pi2 and child objects ci1 and ci2, first to fourth objective function values calculated by the system 100 are provided according to arrangement of the products. In this case, in a case when all values of the first to fourth objective functions of one sample object are greater than values of the first to fourth objective functions of other sample objects, the sample object is defined as in Pareto superiority.

TABLE 2

| Sample object | First objective function value | Second objective function value | Third objective function value | Fourth objective function value | $n_p$ | $S_p$ | Pareto front level |
|---|---|---|---|---|---|---|---|
| First parent (pi1) | 0.62 | 0.86 | 0.41 | 2.32 | 2 | — | 3 |
| Second parent (pi2) | 0.75 | 0.86 | 0.39 | 2.28 | 2 | — | 3 |
| First child (ci1) | 0.87 | 0.89 | 0.57 | 3.13 | 0 | p1, p2, c2 | 1 |
| Second child (ci2) | 0.83 | 0.88 | 0.54 | 3.03 | 1 | p1, p2 | 2 |

The third and fourth objective function values calculated from the first parent object pi1 are greater than the third and fourth objective function values calculated from the second parent object pi2, but the first and second objective function values calculated from the second parent object pi2 are greater than the first and second objective function values calculated from the first parent object pi1, so there is no Pareto superiority/inferiority relationship between the first and second parent objects pi1 and pi2. All the first to fourth objective function values calculated from the first child object ci1 are greater than the first to fourth objective function values calculated from the first and second parent objects pi1 and pi2 and the second child object ci2, so the first child object ci1 is Pareto superior to the first and second parent objects pi1 and pi2 and the second child object ci2.

All the first to fourth objective function values calculated from the second child object ci2 are greater than the first to fourth objective function values calculated from the first and second parent objects pi1 and pi2, so the second child object ci2 is Pareto superiority to the first and second parent objects pi1 and pi2.

The system 100 determines Pareto front levels according to Pareto superiority relationships between sample objects. The system 100 may assign Pareto front levels in ascending order, i.e., in order of decreasing the number np of other sample objects in Pareto superior to a certain sample object. For example, a first child object ci1 having the smallest np value is given a Pareto front level of 1, a second child object ci2 with the next smallest np value is given a Pareto front level of 2, and first and second parent objects pi1 and pi2 with the same np value is given a Pareto front level of 3. In addition, the system 100 sorts the plurality of sample objects according to the Pareto front levels.

In a case where there are a plurality of sample objects having the same Pareto front level, the system 100 may calculate a crowding distance value by using a crowding distance algorithm of a non-dominated sorting genetic algorithm (NSGA-2) as shown in Equation 1 below.

$$cd(i) = \sum_{i=1}^{N} \frac{f_j^{i+1} - f_j^{i-1}}{f_j^{max} - f_j^{min}} \qquad \text{[Equation 1]}$$

(where, i is a sample object index, N is the number of sample objects, $$f_j^i$$

is a value of an j-th objective function of an i-th sample object, $$f_i^{max}$$

is a maximum value of the j-th objective function, and $$f_j^{min}$$

is a minimum value of the j-th objective function)

The system 100 selects a plurality of sample objects in order of increasing Pareto front levels (in the example, the smaller the Pareto front level, the higher the order is.). In a case where pareto front levels are same with each other, a plurality of sample objects is selected in order of increasing crowding distance values. The plurality of sample objects selected may be newly set as sample object data si, and be used as parent objects in the next sample object crossing step S133, thereby producing a plurality of child objects again.

In the solution set average suitability calculation step S136, the system 100 calculates an objective function average value calculated from the sample objects selected in the sample object selection step S135.

When products are loaded in a box according to the loading order information and rotation direction information of sample objects selected in the sample object selection step S135, the system 100 calculates an average value of output values calculated by inputting product arrangement information into one or more objective functions.

In the whether to stop determination step S140, the system 100 determines whether to stop iterated execution of the arrangement information generation step S130 and to output data or not.

The system 100 may count the number of objects having the same loading order information and rotation direction information as each other among the plurality of child objects generated in the sample object variation step S134 or plurality of sample objects selected in the sample object selection step S135, and may determine to stop the iterated execution of the arrangement information generation step S130 in a case where an identical object ratio is greater than or equal to a value of identical object count threshold ratio information that is set as a hyperparameter. The identical object count threshold ratio information may be determined in a range of, for example, 50% or more. Alternatively, the system 100 may determine to stop the iterated execution of the arrangement information generation step S130 in a case where the arrangement information generation step S130 is executed exceeding a value of maximum evolution generation count information that is set as a hyperparameter.

In the data output step S150, the system 100 outputs loading result data to the outside of the system 100.

FIG. 11 is a view briefly illustrating a schema and data of loading result data output by the system in the exemplary embodiment of the present disclosure.

The system 100 may select a sample object having the highest Pareto front level and the largest crowding distance value among the plurality of sample objects selected in the sample object selection step S135, so as to generate and output loading result data Ir to the outside of the system 100.

The loading result data Ir includes: length information lr1 in vertical, horizontal, and height directions of a box; evolution generation count information lr2, which is an iteration count obtained in the arrangement information generation step S130; crowding distance values lr3 of selected sample objects; one or more objective function values lr4 corresponding to the selected sample objects; product number list information lr5 of products loaded into the box; product number list information lr6 of products not loaded in the box; loading order information lr7; rotation direction information lr8; and space coordinate information lr9 of spaces where the loaded products are positioned within the box. In the space coordinate information lr9 of a product, first three numbers thereof may indicate coordinates of a first vertex of the product being loaded and last three numbers thereof may indicate coordinates of a second vertex positioned diagonally from the first vertex.

The system 100 may output loading result data Ir to the outside and then iteratively execute steps S110 to S150 for boxes having different specifications. For example, the system 100 may execute steps S110 to S150 to generate arrangement information of a plurality of products for a "large" box shown in FIG. 4A, and then iteratively execute steps S110 to S150 again to obtain arrangement information for a plurality of products for a "medium" box.

Figure 12:
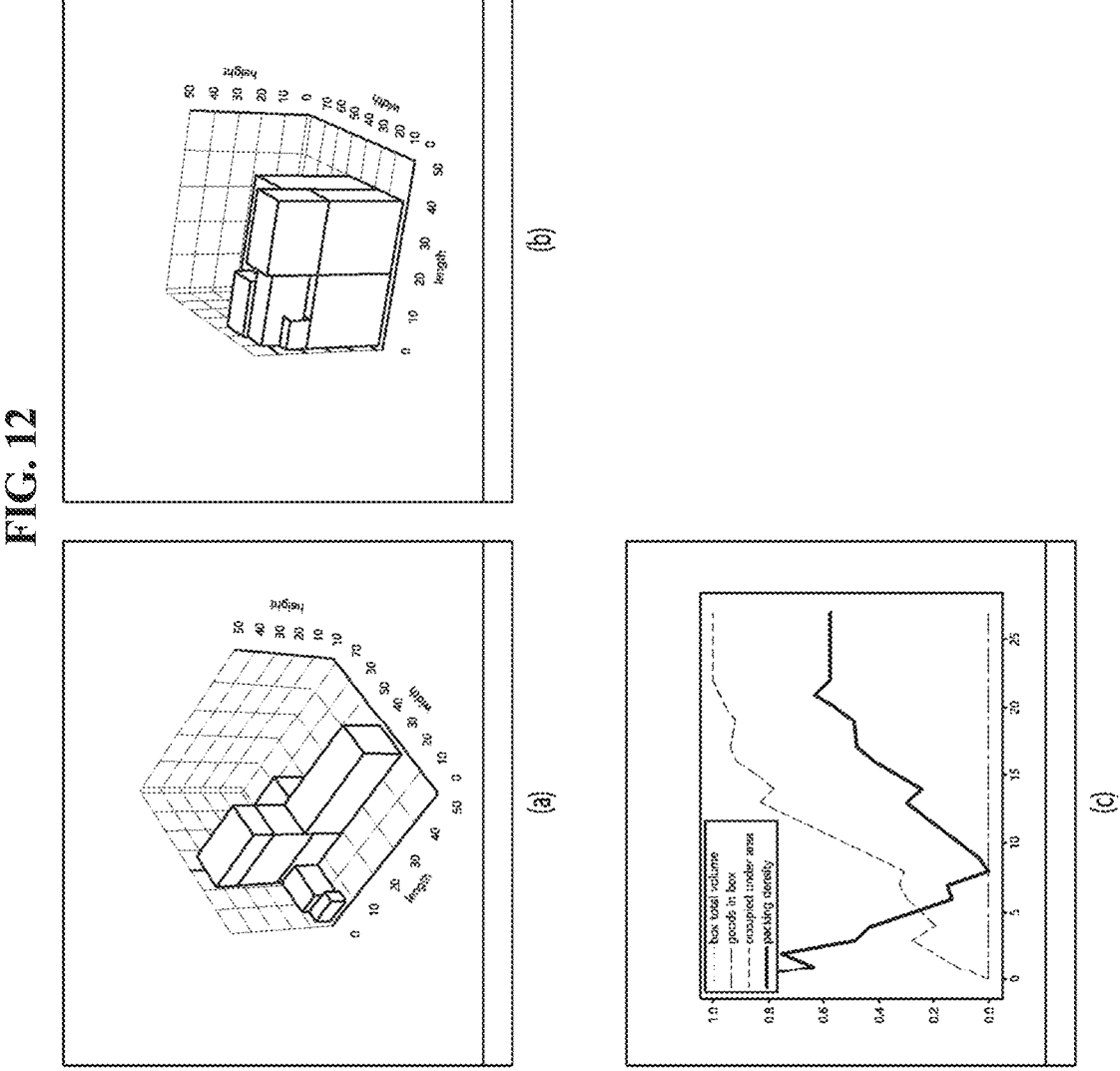
FIG. 12 are views briefly illustrating data output from a display device in the exemplary embodiment of the present disclosure.

FIGS. 12A to 12C are views briefly illustrating data output on a display device in the exemplary embodiment of the present disclosure.

The system 100 may display DBLF result data dr and load result data Ir, which are generated while performing each step of the method according to the exemplary embodiment of the present disclosure externally to system 100 through the display device 14.

The system 100 generates three-dimensional modeling drawings when products are loaded into a box, and displays the drawings through the display device 14 or displays the drawings on a terminal outside the system 100 through the input/output device 13.

The system 100 may generate and display a three-dimensional modeling drawing when products are loaded into a box according to the DBLF simulated packing step S131, as shown in FIGS. 12A to 12C. In addition, the system 100 may generate and display a three-dimensional modeling drawing when product arrangement information for one box is finally generated as shown in FIG. 12B.

As shown in FIG. 12C, the system 100 may generate and display, as a graph, objective function values according to an evolution generation count which is an iteration count in the arrangement information generation step S130, or generate and display change of an average value of the objective functions corresponding to the plurality of sample objects.

Although the exemplary embodiments of the present disclosure have been described above, the present disclosure is not limited to the above exemplary embodiments, and as long as the exemplary embodiments do not deviate from the spirit of the present disclosure and does not impair the effect thereof, the exemplary embodiments may be implemented with various changes within the scope of the detailed description of the embodiments and the accompanying drawings. In addition, naturally, such exemplary embodiments fall within the scope of the present disclosure.

What is claimed is:

1. A method for generating product arrangement information by using product volume information, the method comprising:

creating, in a user interface for three-dimensional modeling, an initial solution set that generates a plurality of first sample objects having randomly generated loading order information and rotation direction information from product specification data comprising product size information and product rotation direction count information; and generating, in the user interface for three-dimensional modeling, an arrangement information by crossing a pair of the first sample objects with each other to generate a plurality of second sample objects, and selecting the plurality of first or second sample objects in order of priority so as to be reset as the first sample objects, wherein the arrangement information optimizes a number of products in a box based at least in part on a dimension of the box, wherein in generating a plurality of second sample objects, slicing sections are randomly determined within a range of the number of products, wherein information comprised in the slicing sections of the first sample objects are copied to slicing sections of the second sample objects corresponding to the first sample objects and wherein the information includes the loading order information and the rotation direction information, and wherein information not overlapped with information comprised in the slicing sections of the second sample objects is sequentially searched from non-slicing sections of the first sample objects so as to be copied to non-slicing sections of the second sample objects not corresponding to the first sample objects resulting in a change in the loading order information and the rotation direction information.

2. The method for claim 1, further comprising, before creating the initial solution set, receiving input of box specification data and the product specification data, wherein the box specification data comprises:

box name information for identifying a box from other boxes;

box size information for representing a length for each dimension; and box dimension information for setting dimensions in vertical, horizontal, and height directions.

3. The method for claim 1, wherein, in creating the initial solution set, the loading order information is generated by randomly selecting numbers from 0 to (the number of products comprised in the product specification data−1) one by one without duplication, and the rotation direction information is generated by randomly selecting numbers from 0 to (the number of product rotation directions by product−1) for each product.

4. The method for claim 1, wherein, in generating the arrangement information, deepest bottom left fill (DBLF) result data comprising coordinate information on coordinates at which products are positioned within the box is generated when the products are loaded into the box according to a DBLF packing method by using the loading order information and the rotation direction information of the first sample objects before crossing the pair of the first sample objects with each other.

5. The method for claim 4, wherein, in generating the arrangement information, one or more objective functions are performed by using the coordinate information on the coordinates at which products comprised in the DBLF result data are positioned in the box after generating the DBLF result data.

6. The method for claim 5, wherein the one or more objective functions comprises:

a first objective function for calculating a ratio of volumes of all the products loaded in the box to a volume of the box;

a second objective function for calculating a value obtained by dividing the number of the products loaded in the box by the number of products comprised in the product specification data;

a third objective function for calculating a ratio of bottom areas of products in contact with a bottom of the box to a bottom area of the box; and a fourth objective function for calculating a value obtained by dividing the volume of all the products loaded in the box by the volume of products having maximum edge lengths.

7. The method for claim 1, wherein, in generating the arrangement information, variation sections are randomly determined within the range of the number of products, pieces of the loading order information comprised in variation sections of the second sample objects are sorted in a reverse order, and the rotation direction information comprised in the variation sections of the second sample objects is randomly changed.

8. The method for claim 1, wherein, in the selecting of the plurality of first to second sample objects according to the priority, output values of one or more objective functions are calculated when products are arranged by using the first and second sample objects, Pareto front levels and crowding distance values of the plurality of first and second sample objects are calculated from the values of the one or more objective functions, and the plurality of first and second sample objects is selected in order of increasing the Pareto front levels or in order of increasing the crowding distance values in a case where the Pareto front levels are same with each other.

9. The method for claim 1, wherein, in a case of the number of objects whose loading order information and rotation direction information are all identical among the plurality of first and second sample objects selected in the arrangement information generation step, when the number of the identical objects is less than a threshold identical object number, generating a second arrangement information, and when the number of the identical objects is greater than or equal to the threshold identical object number, loading result data comprising coordinate information on coordinates at which products are positioned within the box is generated when the products are loaded into the box according to a DBLF packing method by using the loading order information and rotation direction information of an object having a highest pareto front level or having a largest crowding distance value with a case where Pareto front levels are same.

\* \* \* \* \*